Sept. 18, 1962 — F. J. TESTO — 3,054,216
CALL DEVICE
Filed Oct. 3, 1960 — 2 Sheets-Sheet 1

INVENTOR.
FRANK J. TESTO
BY Marmaduke Hobbs
ATTORNEY

Sept. 18, 1962  F. J. TESTO  3,054,216
CALL DEVICE

Filed Oct. 3, 1960  2 Sheets-Sheet 2

*INVENTOR.*
FRANK J. TESTO
BY *Marmaduke Hobbs*
ATTORNEY

United States Patent Office 3,054,216
Patented Sept. 18, 1962

3,054,216
CALL DEVICE
Frank J. Testo, 2708 W. Franklin, Elkhart, Ind.
Filed Oct. 3, 1960, Ser. No. 59,883
2 Claims. (Cl. 46—180)

The present invention relates to a call device, and more particularly to a call device in which the several calls are so arranged with respect to one another that a hunter can readily find the desired call, or shift from one call to another without any interference from the other call.

It is one of the principal objects of the present invention to provide a combination call device, such as a combination of a goose and duck call, which can be easily carried in a pocket or on a strap or cord attached to the hunter and which can readily be used by the hunter in selecting the desired call without any interference from the other call of the combination.

Another object of the present invention is to provide a combination call which is so constructed that the individual calls can be readily identified and used in the same manner as similar calls of separate construction.

Still another object of the invention is to provide a relatively simple, compact combination call, the body of which can be made as a single unit and the parts thereof assembled on the body to form a sturdy, reliable and attractive device, which can be easily carried and manipulated or operated by the hunter without any likelihood of confusion between the several calls.

Further objects and advantages of the present invention will become apparent from the following description and accompanying drawings, wherein.

Figure 2:
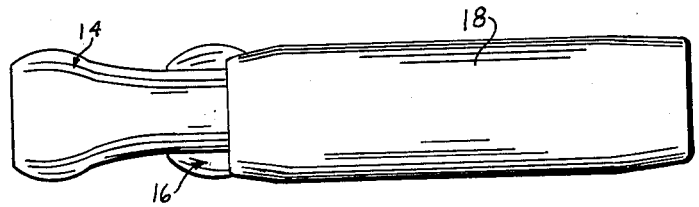
FIGURE 2 is an elevation of one side of the combination call shown in FIGURE 1.
Figure 1:
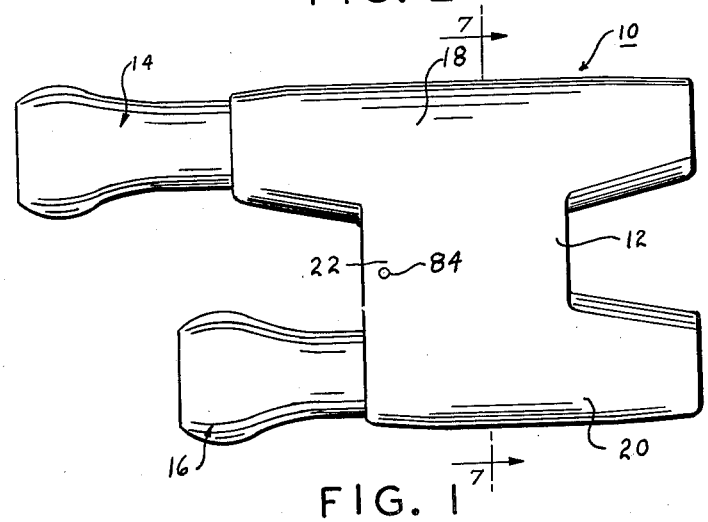
FIGURE 1 is a front elevation of my combination call device, illustrating the combination of a duck and goose call.
Figure 3:
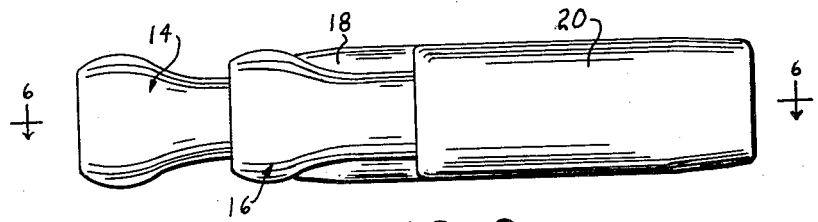
FIGURE 3 is an elevational view of the other side of the call shown in FIGURE 2.
Figure 4:
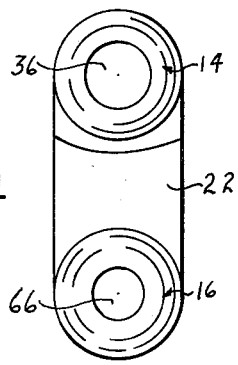
FIGURE 4 is an elevational view of one end of the call combination shown in the preceding figures.
Figure 5:
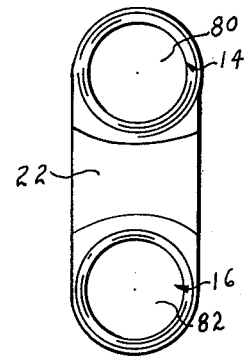
FIGURE 5 is an elevational view of the other end of the combination call.

Referring more specifically to the drawings, and to FIGURE 1 in particular, in which my combination goose and duck call is illustrated, numeral 10 designates the combination call generally, numeral 12 the body thereof, 14 the reed insert of the duck call, and 16 the reed insert of the goose call. The present invention is directed primarily to the combination of two different types of calls, and the present illustration is directed to a combination of this type.

Figure 6:
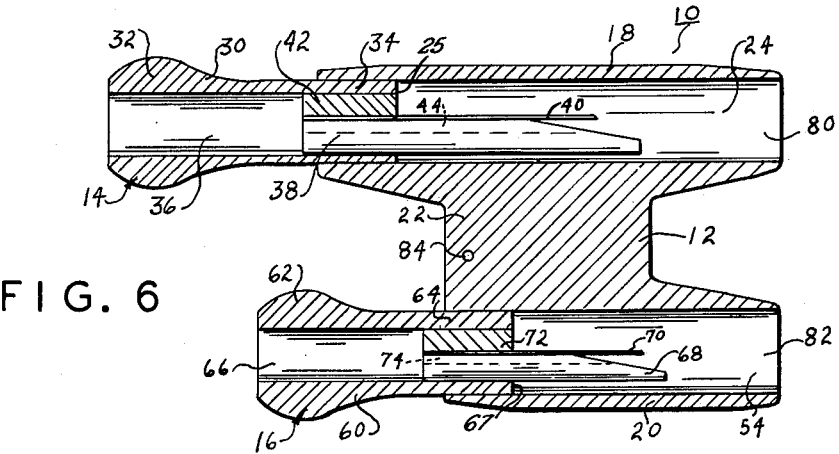
FIGURE 6 is a longitudinal cross sectional view of the present combination call, taken on line 6—6 of FIGURE 3.
Figure 7:
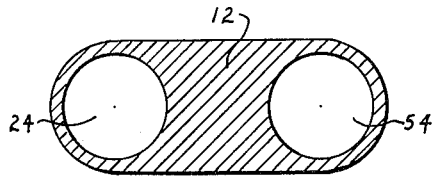
FIGURE 7 is a transverse cross sectional view of the combination call taken on line 7—7 of FIGURE 1, the inserts thereof not being shown.

The body 12 consists of two elongated, primarily cylindrical barrel-like sections 18 for the duck call and 20 for the goose call, said sections being connected by a member 22, preferably formed integrally with sections 18 and 20 to form a rigid structure. Section 18 contains a longitudinal passage 24 extending the full length thereof which receives the inner end 25 of insert 14. The insert may be of various shapes and constructions, the one shown in FIGURE 6 being primarily for the purpose of illustration and consisting of an elongated member 30 with an enlarged rounded end portion 32 and a cylindrical portion 34 seated in one end of passage 24. Member 30 contains a longitudinal passage 36 having mounted in the inner end thereof a stem 38 and reed 40 secured in place in passage 36 by a holder 42. The stem 38 contains a channel 44 of the desired shape to produce, in combination with reed 40, the required duck call sound. Member 30 is formed preferably of wood or plastic with a metal, wood or plastic reed, and is removably inserted as a unit into passage 24.

Section 20 contains a longitudinal passage 54 which extends the full length thereof and receives the inner end of the insert 16. The insert, like the duck call insert 14, may be of various shapes and constructions, the one shown consisting of elongated member 60 with an enlarged rounded end portion 62 and a cylindrical portion 64 seated in one end of passage 54. Member 60 contains a longitudinal passage 66 having mounted in the inner end 67 thereof stem 68 and reed 70 held in place in passage 66 by a holder 72. The stem 68 contains a channel 74 of the desired shape to produce, in combination with reed 70, the required goose call sound. This insert is preferably constructed of wood or plastic, the reed is constructed of metal, wood or plastic, and the insert is removably inserted in passage 54 as a unit.

In the combination call, the spacings of the ends having inserts 14 and 16 and the ends having the mouth portions 80 and 82 are critical features of the device, as will be readily understood by a brief description of the use of the present call. In using the device to call ducks, for example, insert 14 and possibly the adjacent portion of body 12 are grasped between the thumb and the base of the index finger with the hand over the free end of the insert. When the hand is placed in this position, it is completely or substantially completely around the insert, and during the calling operation the fingers and a portion of the hand are continually in motion. Thus, the spacing of inserts 14 and 16 must be sufficiently far apart to permit proper grasping of one of the inserts and freedom of movement of the fingers and hand throughout the calling operation. While the mouth pieces 80 and 82 may be somewhat closer together than inserts 14 and 16, the mouth pieces must be spaced sufficiently far apart to avoid interference from the unused mouth piece while the other is being used to make a call, and when the two portions are parallel as shown in the illustration, the ends of the mouth pieces should be on substantially the same plane. Preferably the spacing shown in the drawings is desirable, in that adequate freedom between mouth pieces is provided without rendering the call combination unduly large and cumbersome.

It is seen that the present call device is compact and easily handled, and each individual call can be readily identified merely by the touch of the hunter's hand. The call will fit loosely into most conventional pockets and can be carried on a thong or cord extending through hole 84 in body 12 and around the hunter's neck or shoulder strap.

While only one embodiment of the present invention has been illustrated in the present application, various changes may be made without departing from the scope of the present invention.

I claim:
1. A combination duck and goose call device for use by a hunter, comprising two generally cylindrical barrel-like sections, each having two ends and a longitudinal passage therethrough from one end to the other, a mouth portion at one end of each section, the mouth portions of the two sections being annular shaped and on substantially the same transverse plane, a reed insert in the end of each section opposite said mouth portion and projecting outwardly substantially beyond said opposite end of each insert's respective section, said sections being of different lengths for identification and being parallel with and spaced from one another sufficiently to permit the hunter to grasp with the hand and substantially surround one reed insert and the adjacent portion of its respective section without interference from the other reed insert and the adjacent portion of said other reed insert's respective section, and a member between said sections connected rigidly thereto and formed integrally therewith and spaced inwardly from the mouth portions and from at least one of said reed inserts.

2. A combination call device for use by a hunter, comprising two generally cylindrical barrel-like sections, each having two ends and a longitudinal passage therethrough from one end to the other, a mouth portion at one end of each section, the mouth portions of the two sections being annular shaped and on substantially the same transverse plane, a reed insert in the end of each section opposite said mouth portion and projecting outwardly substantially beyond said opposite end of each insert's respective section, said sections being of different lengths for identification and being spaced from one another sufficiently to permit the hunter to grasp with the hand and substantially surround one reed insert and the adjacent portion of its respective section without interference from the other reed insert and the adjacent portion of said other reed insert's respective section, and a member between said sections connected rigidly thereto and spaced inwardly from the mouth portions.

References Cited in the file of this patent

UNITED STATES PATENTS

| | | |
|---|---|---|
| 742,680 | Kuhlemeier | Oct. 27, 1903 |
| 2,488,838 | Tierce | Nov. 22, 1949 |
| 2,835,077 | Mittelsteadt | May 20, 1958 |